United States Patent [19]

Yie

[11] Patent Number: 4,862,911

[45] Date of Patent: Sep. 5, 1989

[54] CHECK VALVE ASSEMBLY FOR HIGH PRESSURE PUMPS

[75] Inventor: Gene G. Yie, Auburn, Wash.

[73] Assignee: Fluidyne Corporation, Auburn, Wash.

[21] Appl. No.: 270,090

[22] Filed: Nov. 14, 1988

[51] Int. Cl.⁴ .................. F16K 15/00; F04B 39/10
[52] U.S. Cl. .................. 137/454.4; 137/512; 137/512.5; 417/571
[58] Field of Search .......... 137/454.4, 512, 512.3, 137/512.5, 454.5, 454.6; 417/568, 571

[56] References Cited

U.S. PATENT DOCUMENTS

| | | | |
|---|---|---|---|
| 1,173,703 | 2/1916 | Benkert | 137/512.5 X |
| 2,666,448 | 1/1954 | Garretson et al. | 137/540 |
| 2,942,584 | 6/1960 | Rethmeier | 91/464 |
| 2,962,974 | 12/1960 | Porkert | 417/571 |
| 3,070,023 | 12/1962 | Glasgow | 417/568 X |
| 3,106,169 | 10/1963 | Prosser et al. | 137/512 X |
| 3,370,545 | 2/1968 | Waibel | 417/571 |
| 3,526,246 | 9/1970 | Leitgeb | 137/512.3 |
| 3,540,349 | 11/1970 | Pennther | 91/306 |
| 3,565,191 | 2/1971 | Bowen | 175/207 |
| 3,702,624 | 11/1972 | Fries | 137/512 |
| 3,746,483 | 7/1973 | Hindel et al. | 417/571 |
| 3,811,795 | 5/1974 | Olsen | 417/53 |
| 4,026,322 | 5/1977 | Thomas | 137/512 |
| 4,371,001 | 2/1983 | Olsen | 137/512.3 |
| 4,412,792 | 11/1983 | LaBorde et al. | 417/571 X |

FOREIGN PATENT DOCUMENTS

| | | | |
|---|---|---|---|
| 392758 | 10/1965 | Switzerland | 417/571 |
| 1027934 | 4/1966 | United Kingdom | 417/571 |

Primary Examiner—John Rivell
Attorney, Agent, or Firm—Thomas W. Speckman; Douglas H. Pauley

[57] ABSTRACT

Disclosed herein is a check valve assembly for use in high pressure pumps having a high pressure plunger reciprocating in a pressure chamber or for use in other pressure chambers wherein both fluid inlet check valve means and fluid outlet check valve means are provided adjacent to the pressure chamber. The check valve assembly of the present invention is especially suitable for use in high pressure pumps operating to produce fluid pressures in excess of 10,000 psi, and significantly increases the operating life of the check valve assembly by reducing the incidences of material fatigue caused by cyclic stresses due to cycling high and low pressures.

15 Claims, 3 Drawing Sheets

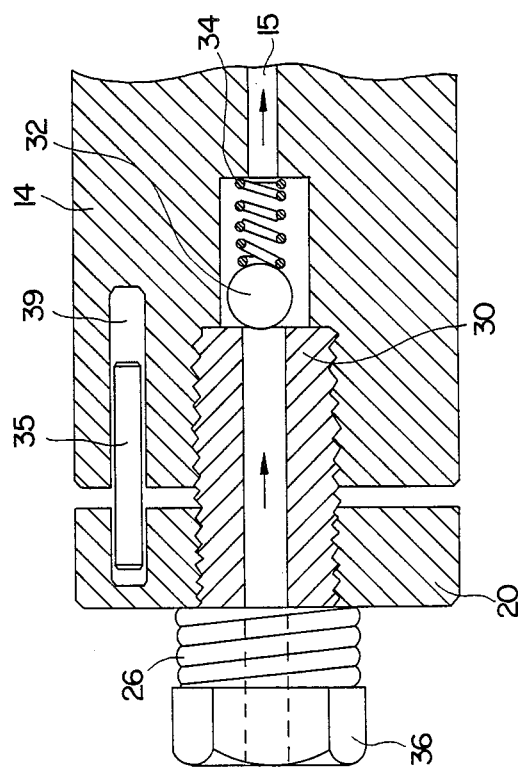

CHECK VALVE ASSEMBLY FOR HIGH PRESSURE PUMPS

BACKGROUND OF THE INVENTION

1. Field of the Invention

The present invention relates to a check valve assembly for use in high pressure pumps having check valve means controlling incoming and outgoing fluid flow. The check valve assembly of the present invention is especially suitable for use in reciprocating pumps or other pressure chambers operating at fluid pressures in excess of 10,000 psi, and may be adapted for use in many different types of reciprocating pumps or pressure chambers, such as electrically or engine driven crankshaft pumps, hydraulically driven fluid pressure intensifiers, and single or multiple cylinder pumps of all sizes and capacities.

2. Description of the Prior Art

Check valve assemblies are critical components in high pressure pumps because they control the flow of fluid into and out from the pressure chamber which houses the reciprocating means. The reliability of check valves is of paramount importance in the operation of high pressure pumps, since any disruption of fluid flow results in disruption of pump operation. Because existing check valves are mounted remote from a pressure chamber such that the inlet and outlet passages and the check valves are exposed to cycling high and low pressures, during intake and compression strokes, check valves and both fluid passages are vulnerable to cyclic stresses and fatigue.

Fluids may be pressurized to levels significantly in excess of 10,000 psi in high pressure reciprocating pumps. Pressure intensifiers which are known to the art are used to pressurize catalyst, water, and other fluids to pressures in excess of 50,000 psi. These types of pumps operate at high reciprocating rates, and the check valves are subject to tremendously high frequency and pressure cyclic stresses. High pressure pumps having multiple reciprocating means are also known to the art.

Inlet and outlet fluid passages located in valve bodies of commercially available high pressure pumps typically have an "L" or a "T" configuration. In an "L" configuration, inlet and outlet check valves communicate by means of valve body fluid passages which are perpendicular to each other. In a "T" arrangement, the inlet and outlet check valves are arranged opposite one another on opposite terminal ends of a valve body fluid passage represented by the top bar of the "T", while a second fluid passage, represented by the vertical bar of the "T", perpendicular to the inlet and outlet fluid passages provides communication between the pressure chamber which houses the reciprocating means and the inlet and outlet passages. In both of these existing arrangements, the inlet and outlet fluid passages are provided in a massive valve body. The check valves may be provided directly in the valve body, or they may be arranged outside of the valve body in proximity to the inlet and outlet fluid passages. High pressure pump manufacturers have also used check valve assemblies having inlet and outlet fluid passages oriented in a "V" arrangement, but material failure due to cyclic stresses from cycling high and low pressures, particularly in the inlet and outlet fluid passages have also been observed in crankshaft pumps and fluid intensifiers having fluid passages arranged in a "V" configuration.

Inlet and outlet fluid passages in high pressure pumps having either an "L" or a "T" arrangement are subjected to cyclic stresses imposed by forces generated by alternating high and low pressures common to reciprocating means. Sharp corners of the inlet and outlet passages are also subjected to high stress concentrations which often result in material fatigue and fracture. U.S. Pat. No. 4,026,322 teaches a reciprocating pump check valve assembly wherein low pressure fluid inlet passages are arranged in an angular, conical configuration terminating at the fluid inlet valve, and a fluid outlet passage is coaxially aligned with the reciprocating means in the pressure chamber. The fluid outlet passage of this check valve assembly is not protected from cyclic stresses which originate in the pressure chamber, and the fluid inlet check valve is too mechanically complex to provide reliable service.

U.S. Pat. No. 2,666,448 teaches a self-sealing relief valve having a helical spring mounted between a threaded nut and a valve member. The spring keeps the valve member seated at all times except when relieving excess pressure from within a container. U.S. Pat. No. 3,106,169 discloses an intensifier high pressure valve and block assembly having an outlet valve member which may be of a poppet valve type. U.S. Pat. No. 3,702,624 teaches a piston pump having an intake valve which is in the form of an annular valve acted upon by a spring which presses the valve upon a seat in a valve housing.

U.S. Pat. No. 3,565,191 discloses a rock-drilling apparatus having an intensifier with a piston and check valves positioned in conduit means for preventing and permitting flow of fluid. U.S. Pat. No. 3,540,349 teaches a double-acting pressure booster having check valves mounted within pressure lines. U.S. Pat. No. 3,070,023 discloses a fluid operated pump having check valves arranged to permit fluid to flow from an enclosure to a conduit.

U.S. Pat. No. 3,811,795 teaches a high pressure fluid intensifier having control valves. U.S. Pat. No. 2,942,584 teaches a reversing valve for a hydraulic reciprocating motor which has spaces on both sides of the motor piston alternately connected to the supply and exhaust of a hydraulic medium by means of a slide valve.

SUMMARY OF THE INVENTION

It is an objective of the present invention to provide a reliable check valve assembly for use in high pressure pumps generating pressurized fluid at pressures in excess of about 10,000 psi which experiences reduced incidences of material fatigue and failure due to cyclic stresses caused by cycling high and low pressure operation.

It is another objective of the present invention to provide a check valve assembly which is suitable for use in a variety of high pressure pumps or other pressure chambers, such as crankshaft pumps and fluid pressure intensifiers, wherein inlet and outlet fluid passages are aligned generally parallel to each other, and inlet and outlet check valves are both positioned adjacent the pressure chamber which may house reciprocating means.

It is yet another objective of the present invention to provide a check valve assembly for high pressure pumps or other pressure chambers which is suitable for use with multiple inlet and/or outlet fluid passages and multiple inlet and/or outlet check valves.

The check valve assembly of the present invention comprises a valve body having at least one low pressure fluid inlet passage and at least one high pressure fluid outlet passage, each fluid passage having check valve means positioned adjacent to the pressure chamber at the chamber end of each fluid passage. Placement of the check valve means adjacent the pressure chamber is an important aspect of this invention for such placement protects the fluid passages from cyclic stresses due to the reciprocating pump action, thus reducing incidences of material fatigue and failure in the fluid passages of the check valve assembly. Placement of the check valve means in proximity to the pressure chamber will expose each fluid inlet passage to only a constant low pressure and each fluid outlet passage to only a constant high pressure, thus eliminating exposure to cycling high and low pressures within each passage.

According to a preferred embodiment of the check valve assembly of the present invention, at least one low pressure fluid inlet passage is aligned generally parallel to at least one fluid outlet passage. Additionally, the check valve assembly of the present invention comprises simplified one-way valve means which provide increased valve operating life and reliability.

The check valve assembly of the present invention is suitable for high pressure applications, and is particularly suitable for use with high pressure reciprocating pumps or other pressure chambers producing or containing pressurized fluid, particularly those fluids at pressures in excess of 10,000 psi. The check valve assembly of the present invention is suitable for use with a wide variety of high pressure reciprocating pumps or other pressure chambers, and is especially suitable for use with motor driven crankshaft pumps and double-acting pressure intensifiers.

BRIEF DESCRIPTION OF THE DRAWINGS

Further features of the present invention will be apparent from the following more detailed description read in conjunction with the following drawings, in which:

FIG. 9 shows a partially sectional side view of an inlet valve arrangement as show in FIGS. 2 and 3, with the section showing a retaining pin mounted in a closed bore of the valve body.

DESCRIPTION OF PREFERRED EMBODIMENTS

Figure 1:
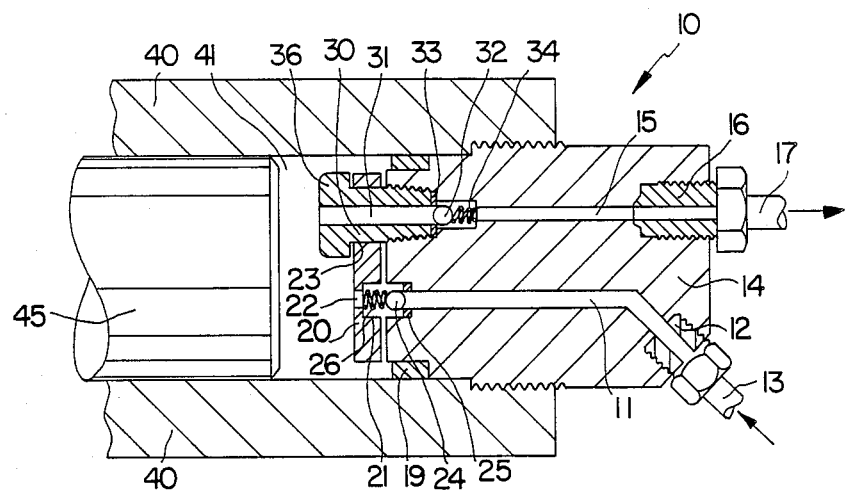
FIG. 1 shows a partially sectional side view of a check valve assembly, according to one embodiment of the present invention, mounted within a pressure cylinder.

As shown in FIG. 1, check valve assembly 10 is sealed and mounted in pressure cylinder 40 in a fluid-tight manner with at least two one-way valve means adjacent pressure chamber 41 wherein piston 45 reciprocates along the central longitudinal axis of pressure cylinder 40. It is apparent that check valve assembly 10 can also be mounted in any type of pressure chamber such as a combustion engine block, pump housing, a vessel, or the like. Low pressure fluid is supplied to check valve assembly 10 through low pressure fluid inlet means 13, which is in fluid-tight communication with low pressure fluid inlet passage 11 by means of fluid inlet fitting 12. It is apparent that other types of fittings or connections exist for connecting an inlet fluid source to fluid inlet passage 11, such as a direct opening to a chamber, compression fitting, and the like. In a similar fashion, high pressure fluid outlet means 17 is in fluid-tight communication with high pressure fluid outlet passage 15 by means of fluid outlet fitting 16.

According to the preferred embodiment shown in FIG. 1, low pressure fluid inlet passage 11 is aligned generally parallel to high pressure fluid outlet passage 15. Alternatively, inlet and outlet fluid passages may be aligned at an angle to the central axis of valve body 14, and according to this embodiment, inlet and outlet fluid passages are preferably arranged symmetrically with respect to the central axis of valve body 14. Fluid inlet and outlet fittings 12 and 16, respectively, may be threadedly engaged with valve body 14, or they may be fluid-tightly sealed and mounted in valve body 14 in other ways which are well known to the art. Similarly, valve body 14 may be directly or indirectly threadedly engaged with high pressure cylinder 40, or valve body 14 may be fluid-tightly sealed and mounted on high pressure cylinder 40 by compression means or other means known to the art.

Piston 45 reciprocates in pressure chamber 41 and, on alternate strokes, draws fluid from low pressure fluid inlet passage 11 into pressure chamber 41 and discharges fluid from pressure chamber 41 through high pressure fluid outlet passage 15. Valve body 14 comprises at least one inlet one-way valve means and one outlet one-way valve means both adjacent pressure chamber 41. In the embodiment of check valve assembly shown in FIG. 1, the inlet valve means comprises inlet valve disk 20 having fluid inlet passage 22 aligned with fluid inlet passage 11, inlet valve closure means, shown as inlet valve ball 24 in a preferred embodiment, and inlet valve spring 26. According to a preferred embodiment, inlet valve recess 21 may be provided in inlet valve disk 20 to accommodate and align inlet valve spring 26, and replaceable inlet valve seat 25 may be provided adjacent inlet valve ball 24. Inlet valve seat 25 may have chamfered edges where inlet valve ball 24 or other inlet valve closure means contacts inlet valve seat 25. In one embodiment, inlet valve seat 25 is an integral part of valve body 14.

The outlet valve means comprises outlet valve fitting 30 mounted and sealed in a fluid-tight manner in valve body 14, with enlarged head 36 projecting into pressure fluid chamber 41, gasket seal ring 33, high pressure fluid outlet passage 31 aligned with fluid outlet passage 15, outlet valve closure means, shown as outlet valve ball 32 in a preferred embodiment, and outlet valve spring 34. Inlet valve disk 20 is provided with outlet valve aperture 23 through which outlet valve fitting 30 passes. Outlet valve fitting 30 with enlarged head 36 aligns and holds inlet valve disk 20 against valve body 14. The opposite end of outlet valve fitting 30 may have chamfered edges around the central fluid passage where outlet valve ball 32 or other outlet valve closure means contacts with outlet valve fitting 30. Static seal 19 is provided to prevent fluid leakage from pressure chamber 41 between valve body 14 and high pressure cylinder 40.

During the power stroke of piston 45, the fluid pressure generated in pressure chamber 41 and fluid outlet passage 31 displaces outlet valve ball 32 against outlet valve spring 34, thus permitting the flow of fluid through the one-way outlet valve into high pressure fluid outlet passage 15. Once the power stroke has ended, the tension of outlet valve spring 34 seats outlet valve ball 32 against outlet valve fitting 30, to prevent fluid flow through high pressure fluid outlet passage 15. Gasket seal ring 33 is compressed by outlet valve fitting 30 against valve body 14 to form a fluid-tight seal. In one embodiment, gasket seal ring 33 is an integral part of outlet valve fitting 30.

The force generated by the intake stroke of piston 45 displaces inlet valve ball 24 against inlet valve spring 26 and draws low pressure fluid through low pressure fluid inlet passage 11 to pressure chamber 41. Once the power stroke of piston 45 has been initiated, the inlet check valve is closed by inlet valve ball 24 seating against inlet valve seat 25 or valve body 14. In this fashion, the inlet and outlet check valves operate independently from each other as one-way valves.

Figure 4:
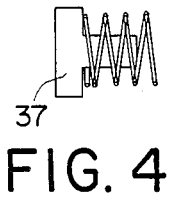
FIG. 4 shows a side view of a valve disk which is suitable for use in the one-way valve means of the check valve assembly.
Figure 5:
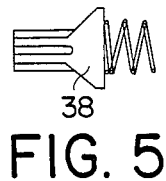
FIG. 5 shows a side view of a valve poppet which is suitable for use in one-way valve means of the check valve assembly.

Piston 45 and pressure cylinder 40 are preferably generally cylindrical. The elements of check valve assembly 10 comprise materials such as stainless steel, carbon steel, plastics, and the like. Other suitable component parts and materials of construction for the elements of check valve assembly 10 are well known to the art. For example, valve disk 37 and valve poppet 38, as shown in FIGS. 4 and 5, respectively, are known to the art for use in check valves and can be used in lieu of inlet valve ball 24 and/or outlet valve ball 32 in the check valve assembly of the present invention. Valve disk means 37 and valve poppet means 38 would normally be used in applications where high flow rates require ample fluid passage and valve balls may create problems with inertia effects. All of the fluid passages, seals, fittings, and connections of the check valve assembly must be capable of withstanding the forces generated by high pressure pump operation.

Figure 2:
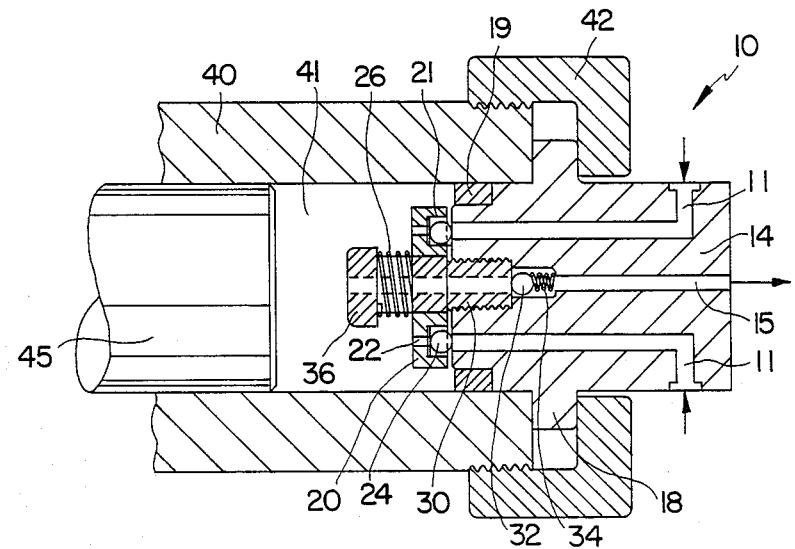
FIG. 2 shows a partially sectional side view of a check valve assembly, according to one embodiment of the present invention, comprising multiple low pressure inlet passages and inlet valve means mounted within a pressure cylinder.

FIG. 2 illustrates an embodiment of check valve assembly 10 having multiple low pressure fluid inlet passages. In this embodiment, valve body 14 is indirectly mounted in pressure cylinder 40 by means of threaded collar 42. Valve body 14 is provided with flange 18 which is larger in diameter than the interior of pressure cylinder 40, and which serves as an attachment flange for collar 42. One important feature of the check valve assembly of the present invention is that regardless of the number or arrangement of inlet and outlet fluid passages, both inlet and outlet check valves are in proximity to pressure fluid chamber 41.

As shown in FIG. 2, each low pressure fluid inlet passage is provided with a one-way check valve means mounted adjacent pressure chamber 41 to protect the fluid inlet passages from cyclic stresses due to high reciprocating rates of piston 45. According to a preferred embodiment, low pressure fluid inlet passages 11 are aligned substantially parallel to high pressure fluid outlet passage 15, with fluid outlet passage 15 aligned with the central longitudinal axis of valve body 14, and multiple fluid inlet passages 11 arranged symmetrically and radially with respect to fluid outlet passage 15. Outlet valve fitting 30 is fluid-tightly sealed and mounted in valve body 14 with central fluid passage 31 aligned with high pressure fluid outlet passage 15, and outlet valve aperture 23 of inlet valve disk 20 is centrally arranged to accommodate outlet valve fitting 30. Inlet valve disk 20 is provided with a plurality of fluid inlet passages 21 corresponding in configuration and arrangement to low pressure fluid inlet passages 11, and is preferably provided with a plurality of inlet valve recesses 21 sized to retain inlet valve balls 24. A single inlet valve spring 26 is provided between enlarged head 36 of outlet valve fitting 30 and inlet valve disk 20. During the intake stroke of piston 45, inlet valve disk 20 is forced against and compresses inlet valve spring 26 to permit fluid to flow from fluid inlet passages 11 into pressure chamber 41. Upon commencement of the power stroke of piston 45, inlet valve disk 20 is forced toward valve body 14 and inlet valve balls 24 fluid-tightly seal low pressure fluid inlet passages 11. The outlet check valve means operates as described above with reference to FIG. 1.

Figure 3:
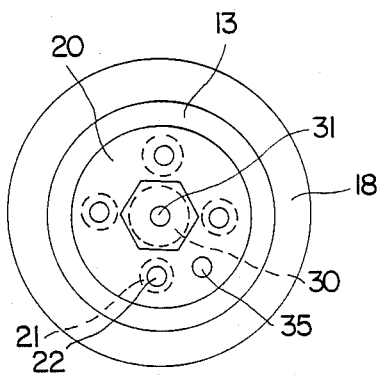
FIG. 3 shows a front view of a check valve assembly, according to one embodiment of the present invention, as viewed from inside the pressure chamber.

FIG. 3 shows an end view of check valve assembly 10 having multiple fluid inlet passages arranged symmetrically with respect to a single high pressure fluid outlet passage. FIG. 3 also shows retaining pin 35 which extends from inlet valve disk 20 and is engaged in a corresponding or mating hole in valve body 14 to prevent rotation of inlet valve disk 20. FIG. 9 shows retaining pin 35 mounted within closed bore 39 of valve body 14. It is apparent that a plurality of retaining pins 35 can be used to prevent rotation of inlet valve disk 20. FIG. 3 illustrates a preferred embodiment of check valve assembly 10 having four low pressure fluid inlet passages and four inlet check valve means arranged radially and symmetrically with respect to the high pressure fluid outlet passage. Any number of low pressure fluid inlet passages, preferably from one to about eight may be provided for fluid supply to pressure fluid chamber 41, and any number of high pressure fluid outlet passages may also be provided. Although the drawings illustrate a single high pressure fluid outlet passage, and this embodiment is preferred for most applications, multiple high pressure fluid outlet passages may be provided and preferred for certain applications.

Figure 6:
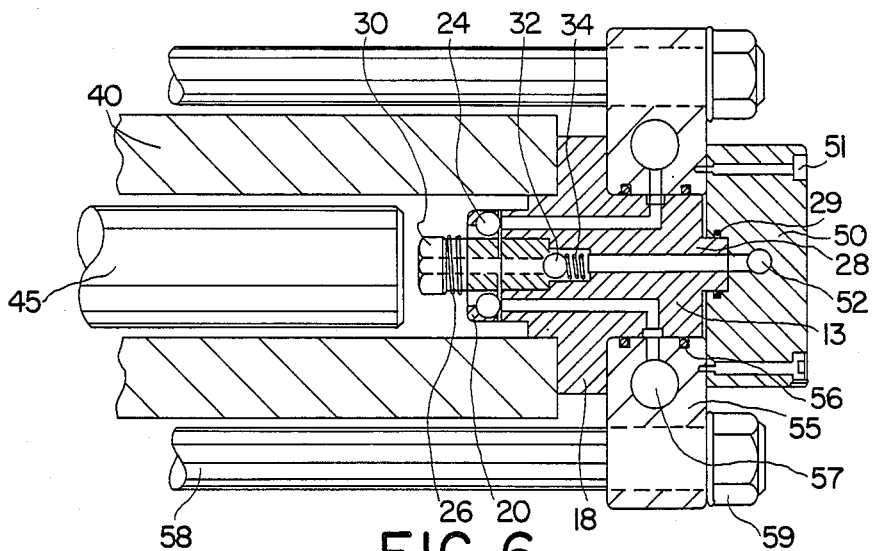
FIG. 6 shows a partially sectional side view of a check valve assembly, according to one embodiment of the present invention, comprising multiple low pressure fluid inlet passages in communication with an inlet fluid manifold and a high pressure fluid outlet passage in communication with an outlet fluid manifold.

FIG. 6 shows fluid inlet and outlet manifolds mounted on the check valve assembly of FIG. 2. Fluid inlet manifold 55 is provided with low pressure fluid inlet means 57 providing low pressure fluid to inlet fluid passages 11 in valve body 14. Low pressure fluid inlet manifold 55 abuts flange 18 of valve body 14 and is fluid-tightly sealed against valve body 14 by tie rods 58 and sealing elements 56. Fluid inlet manifold 55 is provided with bores accommodating tie rods 58, which are retained in inlet fluid manifold 55 by means of enlarged tie rod nuts 59. High pressure fluid outlet manifold 50 is mounted on inlet fluid manifold 55 by means of tie down bolts 51, and is provided with high pressure fluid outlet 52 in fluid-tight communication with fluid outlet passage 15. According to a preferred embodiment of the check valve assembly of the present invention for use with an inlet and outlet manifold, valve body 14 is provided with a central extension 28 and fluid outlet manifold 50 is provided with a corresponding recess to permit, with the aid of sealing elements 29, fluid-tight connection of fluid outlet manifold 50 to valve body 14.

Figure 7:
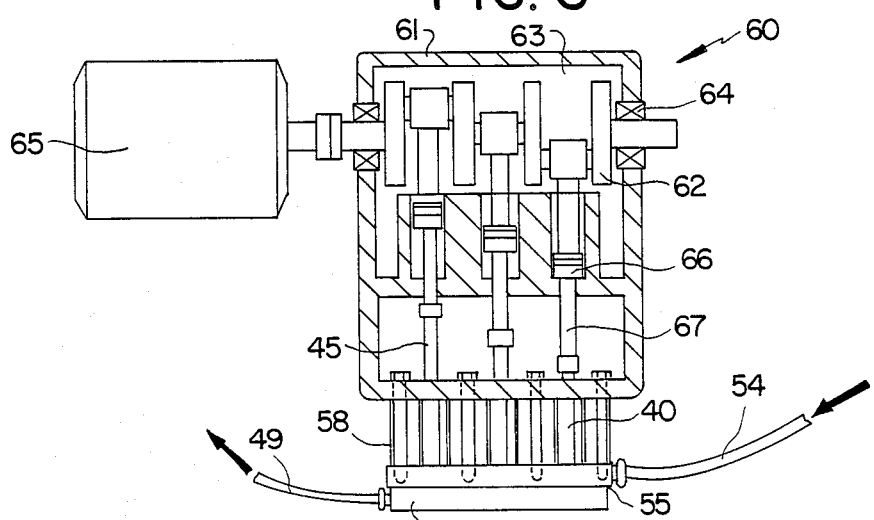
FIG. 7 illustrates a motor driven triplex crankshaft pump suitable for use with the check valve assembly of the present invention.

FIG. 7 shows motor-driven triplex crankshaft pump 60 suitable for use with the check valve assembly of the present invention. Crankshaft 62 is driven by driving means 65, such as an electric motor or engine and is mounted in housing 61 by means of crankshaft bearings 64. Crankshaft 62 drives pistons 66 which are attached to connecting rods 67 that drive plungers 45. Tie rods 58 penetrate pump housing 61 and are rigidly engaged with fluid inlet manifold 55. Pressure cylinders 40 extend between pump housing 61 and fluid inlet manifold 55, and a check valve assembly 10 is provided at the intersection of each pressure cylinder 40 with fluid inlet manifold 55 and fluid outlet manifold 50, as shown in FIG. 6. Low pressure fluid inlet means 54 provides low pressure fluid to fluid inlet manifold 55, and high pressure fluid outlet means 49 is provided as a conduit for high pressure fluid exiting through fluid outlet manifold 50. A high pressure crankshaft pump of this type may be provided with multiple pistons, multiple high pressure plungers, and the like, and preferably provides fluid having a pressure in excess of 10,000 psi.

Figure 8:
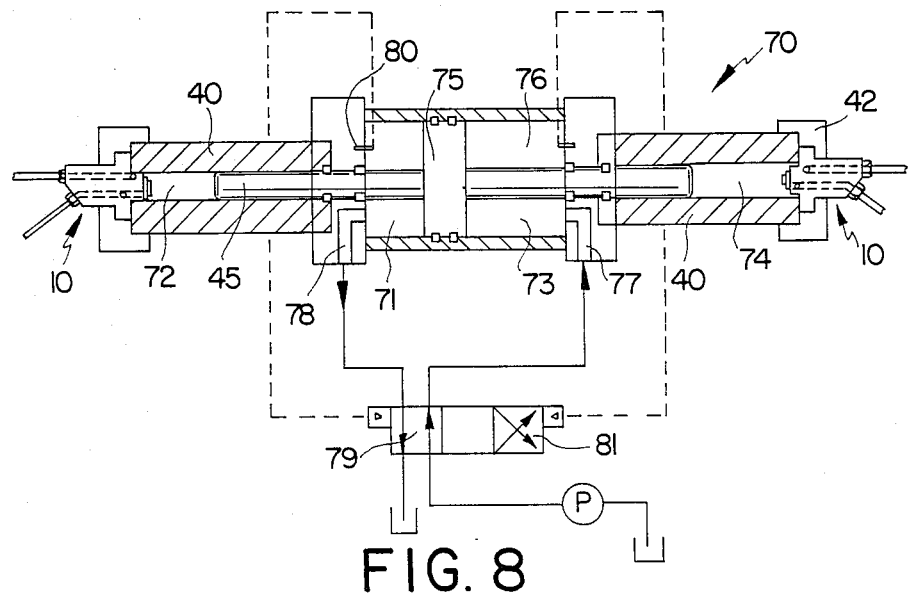
FIG. 8 illustrates a double-acting hydraulically driven pressure intensifier utilizing the check valve assembly of the present invention.

FIG. 8 illustrates another application for the check valve assembly of the present invention, in double-acting, hydraulically driven pressure intensifier 70. Check valve assemblies 10 are mounted at opposite ends of pressure cylinders 40 by means of compression collars 42. Each of two high pressure plungers 45 is attached to reciprocating piston 75, which reciprocates between first low pressure chamber 71 and second low pressure chamber 73 in working fluid chamber 76. The operating principles of double-acting fluid pressure intensifiers are well known to the art, and variations of the embodiment shown in FIG. 8 are suitable for use with the check valve assembly of the present invention. The introduction of pressurized hydraulic working fluid into first and second low pressure chambers 71 and 73, respectively, is controlled by four-way valve control means 81. Four-way valve control means 81, according to a preferred embodiment, is in communication with proximity sensors 80, which detect the location of reciprocating piston 75. As piston 75 is reciprocated in working fluid chamber 76 by the controlled introduction of pressurized working fluid, force is alternately transmitted to high pressure plungers 45 to alternately pressurize fluid introduced into first high pressure chamber 72 and second high pressure chamber 74 by means of check valve assemblies 10. Since the force transmitted to fluid in first and second high pressure chambers 72 and 74, respectively, is the product of the pressure of the working fluid and the surface area of the high pressure plunger, fluid in high pressure chambers 72 and 74 may attain pressures considerably higher than the working fluid introduced into working fluid chamber 76. The "intensification factor" of pumps of this type is determined by the pressure of the working fluid, the cross-sectional surface area of the reciprocating piston in the working fluid chamber, and the cross-sectional surface area of the high pressure plungers. Intensification factors of up to and greater than 20 may be attained in hydraulically driven pressure intensifier pumps of this type, so that working fluid at a pressure of about 5,000 psi may be used to generate fluid pressures of up to about 100,000 psi.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

I claim:

1. A check valve assembly for providing fluid inlet and fluid outlet to a pressure chamber, said check valve assembly comprising: a valve body sealably secured in a wall of said pressure chamber, said valve body having at least one fluid inlet passage extending from an interior wall of said pressure chamber to an exterior wall of said pressure chamber and at least one fluid outlet passage extending from said interior wall of said pressure chamber to said exterior wall of said pressure chamber, each said fluid outlet passage having outlet one-way valve means, each said fluid inlet passage having inlet one-way valve means;

said outlet one-way valve means comprising outlet valve closure means, an outlet valve fitting sealably secured within said valve body, said outlet valve fitting having an outlet valve fitting through hole extending axially through said outlet valve fitting, said outlet valve fitting through hole in communication with said fluid outlet passage, in a closed position of said outlet one-way valve means, said outlet valve closure means sealably seated against said outlet valve fitting, an outlet valve spring supported between said outlet valve closure means and said valve body; and said inlet one-way valve means comprising inlet valve closure means, an inlet valve seat having an inlet valve seat through hole in communication with said fluid inlet passage, said inlet valve seat having one face abutting said valve body and an opposite face sealably mateable with said inlet valve closure means, an inlet valve disk having an inlet valve disk through hole in communication with said fluid inlet passage, said inlet valve disk fixed in an abutted position against said valve body, and an inlet valve spring supported between said inlet valve disk and said valve body.

2. A check valve assembly according to claim 1 wherein said outlet one-way valve means is positioned at a fluid outlet passage chamber end of said fluid outlet passage.

3. A check valve assembly according to claim 1 wherein said inlet one-way valve means is positioned at a fluid inlet passage chamber end of said fluid inlet passage.

4. A check valve assembly according to claim 1 further comprising a gasket seal ring fixed between and abutting said outlet valve fitting and said valve body and having a gasket seal ring through hole in communication with said fluid outlet passage.

5. A check valve assembly according to claim 4 wherein said outlet valve closure means further comprise an outlet valve ball sealably contactable with said gasket seal ring to close communication between said gasket seal ring through hole and said fluid outlet passage.

6. A check valve assembly according to claim 1 wherein said inlet valve closure means further comprise an inlet valve ball sealably contactable with said inlet valve seat to close communication between said inlet valve seat through hole and said fluid inlet passage.

7. A check valve assembly according to claim 1 further comprising a static seal having a ring shape and fixed between said valve body and an inner wall of said pressure cylinder.

8. A check valve assembly according to claim 1 wherein said outlet valve closure means further comprise an outlet valve ball and said outlet valve fitting has chamfered edges around said outlet valve fitting through hole at an end of said outlet valve fitting where said outlet valve ball sealably contacts said outlet valve fitting.

9. A check valve assembly according to claim 1 wherein said inlet valve seat through hole has chamfered edges where said inlet valve closure means contacts said inlet valve seat.

10. A check valve assembly according to claim 1 wherein said inlet valve disk through hole is aligned with said inlet fluid passage.

11. A check valve assembly according to claim 1 wherein said outlet valve closure means further comprise a spherical ball.

12. A check valve assembly according to claim 1 wherein said outlet valve closure means further comprise a valve disk.

13. A check valve assembly according to claim 1 wherein said outlet valve closure means further comprise a valve poppet.

14. A check valve assembly according to claim 1 further comprising: at least one retaining pin secured to said inlet valve disk, said valve body having at least one closed bore, each said retaining pin mateable with each said closed bore to prevent said inlet valve disk from rotating with respect to said valve body.

15. A check valve assembly according to claim 1 further comprising: fluid inlet fitting means and fluid outlet fitting means sealably secured to said valve body, said fluid inlet fitting means in communication with said fluid inlet passage and located near an exterior surface of said valve body, and said fluid outlet fitting means in communication with said fluid outlet passage and located near said exterior surface of said valve body.

* * * * *